United States Patent
Peter et al.

(10) Patent No.: US 12,449,548 B2
(45) Date of Patent: Oct. 21, 2025

(54) METHOD AND DEVICE FOR IDENTIFYING BLOOMING CANDIDATES IN A LIDAR MEASUREMENT

(71) Applicants: Mercedes-Benz Group AG, Stuttgart (DE); Robert Bosch GmbH, Stuttgart (DE)

(72) Inventors: David Peter, Stuttgart (DE); Matthias Pfender, Winnenden (DE); Markus Enzweiler, Deckenpfronn (DE); Axel Fink, Tübingen (DE); Philipp Lehner, Mühlacker (DE)

(73) Assignees: Mercedes-Benz Group AG, Stuttgart (DE); Robert Bosch GmbH, Stuttgart (DE)

( * ) Notice: Subject to any disclaimer, the term of this patent is extended or adjusted under 35 U.S.C. 154(b) by 203 days.

(21) Appl. No.: 18/251,295

(22) PCT Filed: Sep. 8, 2021

(86) PCT No.: PCT/EP2021/074677
§ 371 (c)(1),
(2) Date: May 1, 2023

(87) PCT Pub. No.: WO2022/089819
PCT Pub. Date: May 5, 2022

(65) Prior Publication Data
US 2023/0408702 A1   Dec. 21, 2023

(30) Foreign Application Priority Data
Nov. 2, 2020   (DE) ................ 10 2020 128 732.1

(51) Int. Cl.
*G01S 17/931*   (2020.01)
*G01S 7/481*   (2006.01)
(Continued)

(52) U.S. Cl.
CPC .......... *G01S 17/931* (2020.01); *G01S 7/4816* (2013.01); *G01S 7/4865* (2013.01); *G01S 17/89* (2013.01)

(58) Field of Classification Search
CPC .... G01S 17/931; G01S 7/4816; G01S 7/4865; G01S 17/89; G01S 7/487; G01S 13/865;
(Continued)

(56) References Cited

U.S. PATENT DOCUMENTS 9,080,866 B1 * 7/2015 Dowdall .............. G01S 17/931
2019/0391270 A1 * 12/2019 Uehara ................. G01S 17/04
(Continued)

FOREIGN PATENT DOCUMENTS

DE   102005003970 A1   8/2006
DE   102018003593 A1   10/2018
(Continued)

OTHER PUBLICATIONS

Kaszubiak, J. et al., Real-time vehicle and lane detection with embedded hardware, In: IEEE Proceedings, Intelligent Vehicles Symposium, 2005, 619-624.
(Continued)

*Primary Examiner* — James J Lee
*Assistant Examiner* — Andrew Sang Kim
(74) *Attorney, Agent, or Firm* — Marshall & Melhorn, LLC

(57) ABSTRACT

A method for identifying blooming candidates in a Lidar measurement may include providing a distance-based histogram of points of a point cloud generated in the Lidar measurement. In the histogram, clusters of points having the same distance to a Lidar sensor carrying out the Lidar measurement are identified and intensities of the points of a cluster are evaluated. If the cluster contains points, the intensities of which exceed in each case a predefined limit
(Continued)

value, those points of the cluster, the intensities of which do not exceed in each case the predefined limit value and in particular fall below the predefined limit value by more than a predefined threshold value, are classified as blooming candidates.

4 Claims, 1 Drawing Sheet

(51) Int. Cl.
*G01S 7/4865* (2020.01)
*G01S 17/89* (2020.01)

(58) Field of Classification Search
CPC ...... G01S 13/931; G06V 10/30; G06V 10/50; G06V 20/56; G06V 40/16; G06V 10/757
See application file for complete search history.

(56) References Cited

U.S. PATENT DOCUMENTS

2020/0141716 A1* 5/2020 Droz ................... G01S 7/4813
2020/0249326 A1* 8/2020 Bhaskaran ............ G01S 7/4815

FOREIGN PATENT DOCUMENTS

| DE | 112018004891 T5 | 6/2020 |
| JP | 2014098635 A | 5/2014 |
| JP | 2019521355 A | 7/2019 |
| WO | 2019044571 A | 3/2019 |

OTHER PUBLICATIONS

Hoegg, Thomas et al., Time-of-Flight camera based 3D point cloud reconstruction of a car, Computers in Industry, vol. 64, No. 9, Jul. 31, 2013, pp. 1099-1114, Amsterdam, Netherlands.
German Patent and Trademark Office, Office Action in Application No. DE 10 2020 128 732.1, dated May 18, 2021, 7 pages, Munich, Germany.
Eureopan Patent Office, International Search Report and Written Opinion in Application No. PCT/EP2021/074677, dated Jan. 4, 2022, 11 pages, Rijswijk, Netherlands.

* cited by examiner

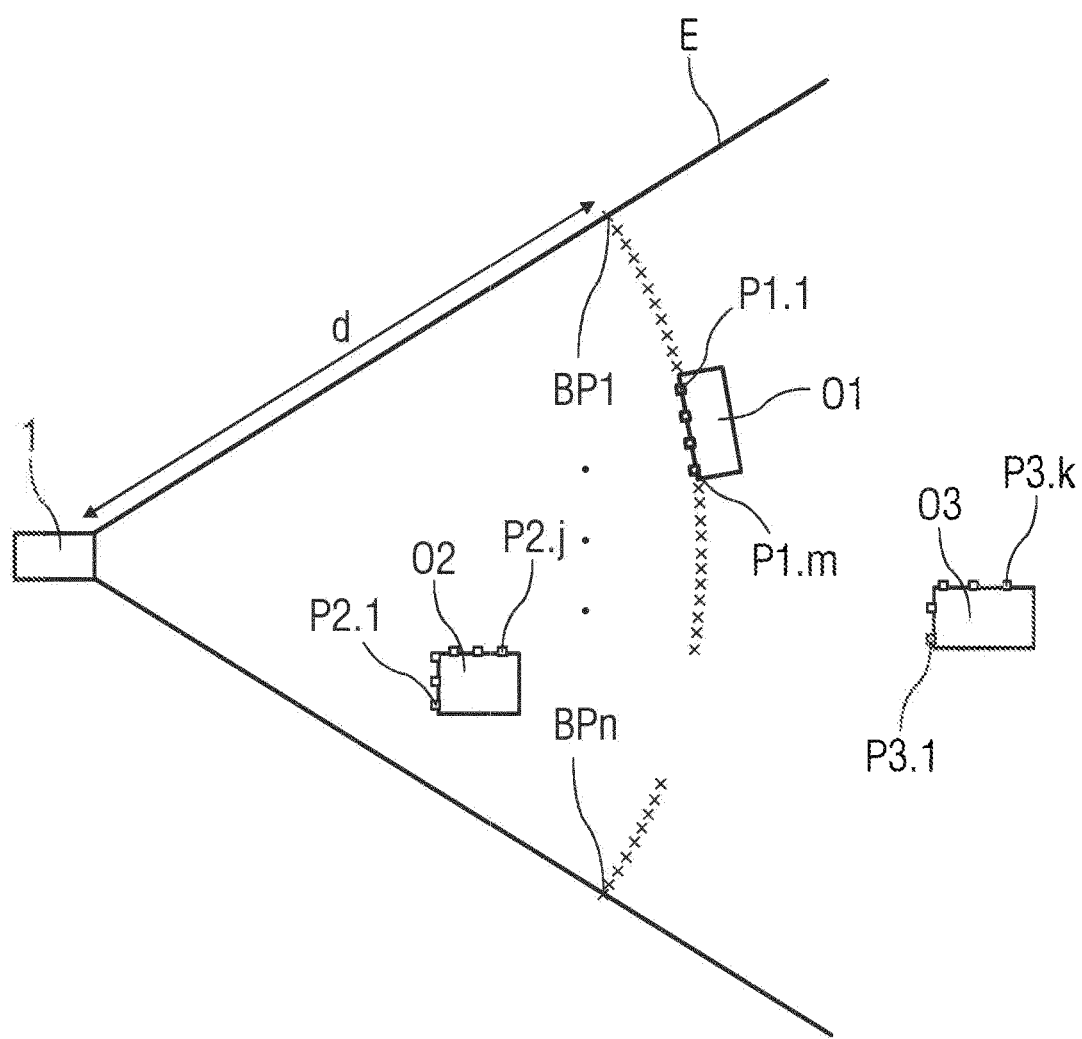

METHOD AND DEVICE FOR IDENTIFYING BLOOMING CANDIDATES IN A LIDAR MEASUREMENT

FIELD

The invention concerns a method for identifying blooming candidates in a Lidar measurement.

The invention further concerns a device for identifying blooming candidates in a Lidar measurement and an application for the method.

BACKGROUND

DE 10 2005 003 970 A1 discloses a method for determining the operability of a sensor array on a vehicle, wherein an area covered by the sensor array is divided into different sub-areas and sensor signals sent to a sub-area from a specific surrounding area are assessed in order to determine the operability of the sensor array. This involves assessing sensor signals that are detected sequentially for different sub-areas while driving past them to the specific surrounding area. The sub-areas are detection areas for different Lidar sensors or different angle sectors of one Lidar sensor.

In addition, DE 10 2018 003 593 A1 discloses a method for operating an assistance system on a vehicle, in which the vehicle is driven autonomously by the assistance system and the assistance system comprises a surroundings sensor array with a number of detection units arranged in and/or on the vehicle. By means of the detection units, the vehicle's surroundings and objects located therein are detected during autonomous operation of the vehicle, wherein by means of a monitoring module a function of the individual detection units is monitored continuously, and in the event of the failure of a detection unit, only an assistance function connected to that failed detection unit is deactivated by a planning module connected to the monitoring module. The detection units contain a Lidar-based sensor.

DE 10 2020 110 809.5, not yet published, describes a device and a method for identifying blooming in a Lidar measurement, wherein a distance to a Lidar reflection point is determined in an active measurement and a passive measurement. In this case, a first distance value is determined in the active measurement, based on the signal transit time of a laser impulse. Then a second distance value is determined in the passive measurement, based on the triangulation of two-dimensional intensity measurements taken from different measurement positions. Blooming is then indicated if the second distance value exceeds the first distance value by a preset value.

"Kaszubiak, Jens; [et al.]. Real-time vehicle and lane detection with embedded hardware. In: IEEE Proceedings. Intelligent Vehicles Symposium, 2005. IEEE, 2005. Pages 619-624" discloses a method for detecting the surroundings of a vehicle using a stereo camera.

In addition US 2019/0391270 A1 describes a device and a method for reducing the influences of highly reflective objects in Lidar data.

SUMMARY

The goal of the invention is to introduce a new method and a new device for identifying blooming candidates in a Lidar measurement, as well as an application for such a method.

The invention achieves this goal by means of a method, a device, and an application having the features presented in the claims.

Advantageous embodiments of the invention are the object of the subordinate claims.

In the method for identifying blooming candidates in a Lidar measurement according to the invention, a distance-based histogram of points for a point cloud generated in the Lidar measurement is established. In the histogram, clusters of points at the same distance from the Lidar sensor taking the Lidar measurement are identified and intensities of the points in a cluster, in particular a specific cluster, are evaluated. If the cluster contains points whose intensities exceed a predefined limit value at that time, then the points in the cluster whose intensities do not exceed the predefined limit at that time, and in particular lie below the predefined limit value by more than a predefined threshold value, are classified as blooming candidates. In one possible embodiment of the method, those points in the cluster whose intensities exceed the predefined limit value are classified as highly reflective measurement values, in particular as true-positive measurement values.

Blooming is understood to mean overexposure or cross-talk in a Lidar measurement.

Blooming occurs, for example, when a laser pulse emitted from a Lidar is reflected by a highly reflective target, such as a traffic sign or light reflector, in particular a target consisting of a taillight reflector. In this case, a large volume of emitted energy is sent back to the Lidar in comparison to less-reflective targets. The light beam sent back in that event is normally not optimally focused. There are several reasons for this: often the reflection from the target is not normally and optimally mirrored, particles in the atmosphere diffract the laser beam, or dirt on a Lidar cover causes light scattering. This can lead to the reflected light affecting Lidar receptor cells that are farther apart from each other or reflected light spilling over to adjacent pixels. The result is that—depending on the sensitivity of the detector—a distance measurement is generated. Blooming effects are normally stronger at shorter distances from the Lidar, because the volume of energy reflected by a target decreases rapidly with increasing distance that the light must travel back.

Lidars play an important roll in vehicle assistance systems and other automated operating platforms, such as robots, because they permit a precise three-dimensional representation of the Lidar's surroundings. However, the occurrence of blooming can lead to false results when measuring distances between the Lidar and objects located in its surroundings. In particular, blooming effects can cause false-positive Lidar measurements, so that the precise three-dimensional representation of the surroundings is impeded.

Using the method, reliable identification of blooming candidates in Lidar measurements is easily possible, so that false results in such distance measurements can be prevented or at least identified with certainty and blooming candidates can correspondingly be handled as such, for example, in downstream software modules. The result is more reliable operation of applications, such as automated, in particular highly automated or autonomously driven or moved vehicles and robots.

Therefore, for example, use of the method during operation of an automated, in particular highly automated or autonomously operable, vehicle or robot minimizes the danger, in subsequent data processing, such as a sensor fusion, that an obstacle such as the end of a traffic jam will be assumed at positions where blooming appears.

In particular, such use of the method during operation of an automatically operable vehicle or robot involves steering the vehicle or robot based on data collected in Lidar measurements, wherein points classified as blooming candidates by means of the method are taken into account. For example, results from the method are flowed into an algorithm that decides whether a detected point is an object or a measurement resulting from blooming.

For example, unnecessary braking, steering actions, and/or other measures initiated by a driver assistance system due to the appearance of blooming can safely be avoided. The concealment of actual obstacles by blooming candidates can also be identified with certainty.

In another possible embodiment of the method, when generating the point cloud, linear laser pulses and/or rectangular laser pulses are sent out from a transmitter of the Lidar sensor. This allows exceptionally wide spatial resolution with a simultaneous exceptionally low scan time by the Lidar sensor. For each laser pulse reflected by an object that appears on a receiver of the Lidar sensor, a point is generated in the point cloud, and in order to determine a distance to objects, in the Lidar sensor's surroundings a time until a reflected laser pulse reaches a receiver of the Lidar sensor is detected, and each point is assigned a value for a determined distance.

In another possible embodiment of the method, by means of laser pulses the surroundings are scanned separately in rows, in columns, and/or in multiple sub-areas. This permits reliable and precise detection and mapping of the Lidar sensor's surroundings.

To further increase the precision of detecting and mapping the Lidar sensor's surroundings, in another possible embodiment of the method the Lidar sensor's surroundings are divided into multiple sub-areas, and for each sub-area at least one distance-based histogram of points in a point cloud generated in the Lidar measurement is created.

The device for identifying blooming candidates in a Lidar measurement according to the invention comprises a processing unit that is configured to create a distance-based histogram of points in a point cloud generated in the Lidar measurement, identify clusters of points in the histogram at the same distance from the Lidar sensor performing the Lidar measurement, evaluate intensities of the points in a cluster, in particular a specific cluster, and then, if the cluster contains points whose intensities exceed a predefined limit value at that time, classify the points in the cluster whose intensities do not exceed the predefined limit at that time, and in particular lie below the predefined limit value by more than a predefined threshold value, as blooming candidates. In one possible embodiment of the device, the processing unit is configured to classify those points in the cluster whose intensities exceed the predefined limit value as highly reflective measurement values, in particular as true-positive measurement values.

Using the device, reliable identification of blooming candidates in Lidar measurements is easily possible, so that false results in such distance measurements can be prevented or at least identified with certainty and blooming candidates can correspondingly be handled as such, for example, in downstream software modules. The result is more reliable operation of applications, such as automated, in particular highly automated or autonomously driven or moved vehicles and robots.

Therefore, for example, use of the device during operation of an automated, in particular highly automated or autonomously operable, vehicle or robot minimizes the danger, in subsequent data processing, such as a sensor fusion, that there may be an obstacle such as the end of a traffic jam at positions where blooming appears. For example, resulting unnecessary braking initiated by a driver assistance system can safely be avoided. The concealment of actual obstacles by blooming candidates can also be identified with certainty.

In another possible embodiment of the device, the Lidar sensor comprises at least one grid-based receiver, which allows exceptionally wide spatial resolution with a simultaneous exceptionally low scan time by the Lidar sensor.

DESCRIPTION OF THE FIGURES

Examples of the invention are explained in more detail below, with reference to a FIGURE.

The FIGURE shows:

FIG. 1 a schematic of a Lidar sensor with a detection area and objects located in the detection area.

DETAILED DESCRIPTION

In FIG. 1, a Lidar sensor 1 and the surroundings being monitored by the Lidar sensor 1 are shown from above.

Within the surroundings of the Lidar sensor 1 there are three objects O1 to O3, which are detected by the Lidar sensor 1 within a detection area E.

The Lidar sensor 1 is, for example, located on an automated, in particular a highly automated or autonomously driving, vehicle. The Lidar sensor 1 can alternatively also be located on a robot.

The first object O1 is a highly reflective object O1, such as a reflective traffic sign or the license plate of a vehicle. The second object O2 and the third object O3 each are less reflective.

The Lidar sensor 1 determines distances to objects O1 to O3 in these surroundings, wherein laser pulses are sent out and a time is detected until a reflected laser pulse reaches a specifically grid-configured receiver of the Lidar sensor 1. This allows the Lidar sensor 1 to include multiple transmitters configured as lasers and/or multiple receivers, in order to increase the measurement rate and the spatial resolution of the Lidar sensor 1. Therefore, a measurement taken by the Lidar sensor 1, also called a scan, can be taken in such a way that a complete scan can be interpreted as a two-dimensional measurement grid, also called a Lidar picture.

In particular, when generating a point cloud, linear laser pulses and/or rectangular laser pulses are sent out from the transmitter of the Lidar sensor 1. In particular, by means of laser pulses the surroundings are scanned separately in rows, in columns, and/or in multiple sub-areas.

For each laser pulse reflected by an object O1 to O3 that appears on the Lidar sensor's receiver, a point P1.1 to P1.$m$, P2.1 to P2.$j$, P3.1 to P3.$k$ is generated in the point cloud, and in order to determine the distance to the objects O1 to O3 in the Lidar sensor's surroundings, the time until the reflected laser pulse reaches the Lidar sensor's receiver is detected. Then a determined distance value is assigned to each point. The shown points P1.1 to P1.$m$, P2.1 to P2.$j$, P3.1 to P3.$k$, which relate directly to the objects O1 to O3, therefore represent true-positive measurements. These points P1.1 to P1.$m$, P2.1 to P2.$j$, P3.1 to P3.$k$ are shown in FIG. 1 as small squares. The points P3.1 to P3.$k$, which relate to the third object O3, are second-order measurement points due to its position.

In the pictured surroundings of the Lidar sensor 1, the first object O1 generates points BP1 to BPn, identified as blooming points due to their high reflectivity during the laser measurement, around, above, and below the object O1 at the same distance to the Lidar sensor 1, so that a so-called blooming artefact exists. These points BP1 to BPn are shown in FIG. 1 as crosses. These points BP1 to BPn are distributed in a semicircle around the object O1 at the same distance from the Lidar sensor 1. If these points BP1 to BPn configured as blooming points are not detected as such, the danger exists that in subsequent data processing, such as a sensor fusion, an obstacle such as the end of a traffic jam will be assumed, so that unnecessary braking could be triggered by a driver assistance system. In addition, real obstacles, such as the object O3, for example, can be hidden by such blooming artefacts, so that they are not identified in the Lidar measurements.

The points BP1 to BPn configured as blooming points therefore represent false-positive measurements.

In order to detect these points BP1 to BPn configured as blooming points, the invention provides for the creation of a distance-based histogram, also called a range-based histogram, from points P1.1 to P1.$m$, P2.1 to P2.$j$, P3.1 to P3.$k$, BP1 to BPn in the point cloud generated by the Lidar measurement. A distance-based histogram in this case is a histogram that shows how many points P1.1 to P1.$m$, P2.1 to P2.$j$, P3.1 to P3.$k$, BP1 to BPn are detected at which distances. In creating the histogram, the surroundings of the Lidar sensor 1 can be divided into multiple sub-areas and a distance-based histogram can be created from points P1.1 to P1.$m$, P2.1 to P2.$j$, P3.1 to P3.$k$, BP1 to BPn in the point cloud generated by the Lidar measurement.

From the data detected by the Lidar sensor 1, two features per point P1.1 to P1.$m$, P2.1 to P2.$j$, P3.1 to P3.$k$, BP1 to BPn can also be determined. This is the distance from each point P1.1 to P1.$m$, P2.1 to P2.$j$, P3.1 to P3.$k$, BP1 to BPn to the Lidar sensor 1, as already described above, and a measured intensity of each point P1.1 to P1.$m$, P2.1 to P2.$j$, P3.1 to P3.$k$, BP1 to BPn, i.e., the light volume from the object O1 to O3 at each point P1.1 to P1.$m$, P2.1 to P2.$j$, P3.1 to P3.$k$, BP1 to BPn that is sent back to the receiver of the Lidar sensor 1.

Based on the intensity feature, from the volumes of the identically distanced points P1.1 to P1.$m$ and BP1 to BPn, the points P1.1 to P1.$m$ can be differentiated from the points BP1 to BPn that are configured as blooming points, because a large volume of high-intensity light is reflected back to the receiver from the object O1, i.e., from the points P1.1 to P1.$m$. False-positive measurements due to the blooming effect at the points BP1 to BPn are generated by scattered light in the lens of the Lidar sensor 1 on its receiver. The intensity involved is typically several orders of magnitude less than the intensity of points P1.1 to P1.$m$.

The distance-based histogram is then generated, and Lidar measurements are inserted into a column in the histogram. If there are blooming effects, a very high number of points at exactly the same distance is expected, here P1.1 to P1.$m$ and BP1 to BPn at distance d. This causes high oscillation within a histogram bin. It is highly unlikely that these measurements are coming from a real object O1 to O3, because the Lidar sensor 1 would have to be located in a very large sphere to get back a corresponding signal. If at the same time there are high intensity values in the same bin of the histogram, i.e., for many points P1.1 to P1.$m$, BP1 to BPn at the same distance from the Lidar sensor 1, a blooming effect can be inferred with certainty.

For this reason, clusters of points P1.1 to P1.$m$, P2.1 to P2.$j$, P3.1 to P3.$k$, BP1 to BPn are identified in the histogram at the same distance to the Lidar sensor 1 taking the Lidar measurement. In the preceding case, a cluster of points is identified at the distance d, specifically points P1.1 to P1.$m$ and BP1 to BPn. In addition, the intensities of these points P1.1 to P1.$m$ and BP1 to BPn are evaluated. If evaluation of the intensities shows that this cluster contains points whose intensities exceed a predefined limit value at that time, the conclusion is a blooming effect, because blooming occurs with highly reflective objects and high intensities are an indicator of a highly reflective object. All of the points in that cluster whose intensities exceed the predefined limit value at that time, here points P1.1 to P1.$m$, are classified as highly reflective measurement values, in particular as true-positive measurement values. All points in the cluster whose intensities do not exceed the predefined limit at that time, and in particular specifically lie significantly below the predefined limit value, i.e., by more than a predefined threshold value, are classified as blooming candidates. This applies to points BP1 to BPn.

In one possible embodiment, downstream algorithms in a sensor fusion process the acquired information. Through the use of additional information acquired from other sensors, such as Lidar sensors in other positions, cameras, or radar sensors, the information acquired from the Lidar sensor 1 can be identified as plausible or expanded.

For example, results concerning blooming candidates are flowed into an algorithm that decides whether a detected point P1.1 to P1.$m$, P2.1 to P2.$j$, P3.1 to P3.$k$, BP1 to BPn is an object O1 to O3 or a measurement resulting from blooming.

If a measurement resulting from the appearance of blooming is identified in the Lidar measurement, the driver assistance system does not perform the braking, steering, and/or other measures, for example, that it would if there were a real object O1 to O3, and thereby avoids any resulting hazards to vehicle occupants and other vehicles in traffic.

It is also possible that, if a measurement resulting from the appearance of blooming is identified in the Lidar measurement, the concealment of actual obstacles by blooming candidates can be identified with certainty. If such concealment is identified, the failure by a driver assistance system to brake, steer, and/or apply other measures automatically can effectively be prevented, so that the danger to vehicle occupants and other vehicles in traffic is further reduced.

LIST OF REFERENCE INDICATORS

1 Lidar sensor
BP1 to BPn Point
d Distance
E Detection area
O1 to O3 Object
P1.1 to P1.$m$ Point
P2.1 to P2.$j$ Point
P3.1 to P3.$k$ Point

The invention claimed is:
1. A method for identifying blooming candidates in a Lidar measurement, comprising:
   a distance-based histogram of points is created for a point cloud generated by the Lidar measurement,
   clusters of points at a same distance to a Lidar sensor taking the Lidar measurement are identified in the histogram,
   intensities of points in a cluster are evaluated, and
   then, in response to the cluster containing points whose intensities exceed a predefined limit value respectfully, those points in the cluster whose intensities do not exceed the predefined limit value respectfully, and lie below the predefined limit value by more than a predefined threshold value, are classified as blooming candidates, wherein points in that cluster whose intensities exceed the predefined limit value respectfully are classified as highly reflective measurement values and as true-positive measurement values, wherein when the point cloud is generated:
- linear laser pulses and/or rectangular laser pulses are sent out from a transmitter of the Lidar sensor,
- for each laser pulse reflected by an object that appears on the receiver of the Lidar sensor, a point is generated in the point cloud,
- to determine a distance to objects in a surroundings of the Lidar sensor, a time is detected until a reflected laser pulse reaches a specific receiver of the Lidar sensor, and
- a value for a determined distance is assigned to each point, and control at least partially autonomous vehicle or robot based on data collected in the Lidar measurements, and the points classified as blooming candidates.

2. A method for identifying blooming candidates in a Lidar measurement, comprising:
- a distance-based histogram of points is created for a point cloud generated by the Lidar measurement,
- clusters of points at a same distance to a Lidar sensor taking the Lidar measurement are identified in the histogram,
- intensities of points in a cluster are evaluated, and
- then, in response to the cluster containing points whose intensities exceed a predefined limit value respectfully, those points in the cluster whose intensities do not exceed the predefined limit value respectfully, and lie below the predefined limit value by more than a predefined threshold value, are classified as blooming candidates, wherein points in that cluster whose intensities exceed the predefined limit value respectfully are classified as highly reflective measurement values and as true-positive measurement values, wherein when the point cloud is generated:
- linear laser pulses and/or rectangular laser pulses are sent out from a transmitter of the Lidar sensor,
- for each laser pulse reflected by an object that appears on the receiver of the Lidar sensor, a point is generated in the point cloud,
- to determine a distance to objects in a surroundings of the Lidar sensor, a time is detected until a reflected laser pulse reaches a specific receiver of the Lidar sensor, and a value for a determined distance is assigned to each point, wherein via the laser pulses the surroundings are scanned separately in rows, in columns, and/or in multiple sub-areas, and
- control a at least partially autonomous vehicle or robot based on data collected in the Lidar measurements, and the points classified as blooming candidates.

3. The method as in claim 1, wherein the surroundings of the Lidar sensor are divided into multiple sub-areas and a distance-based histogram is created from points in a point cloud generated by the Lidar measurement.

4. A method for identifying blooming candidates in a Lidar measurement, comprising:
- a distance-based histogram of points is created for a point cloud generated by the Lidar measurement,
- clusters of points at a same distance to a Lidar sensor taking the Lidar measurement are identified in the histogram,
- intensities of points in a cluster are evaluated, and then, in response to the cluster containing points whose intensities exceed a predefined limit value respectfully, those points in the cluster whose intensities do not exceed the predefined limit value respectfully, and lie below the predefined limit value by more than a predefined threshold value, are classified as blooming candidates,
- wherein during operation of a partially automated or autonomously operable vehicle or robot, control of the vehicle or robot is based on data collected in the Lidar measurements, and the points classified as blooming candidates are taken into account.

* * * * *